United States Patent
Garrison, III

(10) Patent No.: US 11,919,760 B2
(45) Date of Patent: Mar. 5, 2024

(54) SYSTEMS AND METHODS FOR CONTROL OF A REMOTELY CONTROLLABLE MATERIAL HANDLING VEHICLE

(71) Applicant: The Raymond Corporation, Greene, NY (US)

(72) Inventor: Theodore C. Garrison, III, Greene, NY (US)

(73) Assignee: The Raymond Corporation, Greene, NY (US)

( * ) Notice: Subject to any disclaimer, the term of this patent is extended or adjusted under 35 U.S.C. 154(b) by 55 days.

(21) Appl. No.: 17/193,733

(22) Filed: Mar. 5, 2021

(65) Prior Publication Data
US 2021/0276843 A1  Sep. 9, 2021

Related U.S. Application Data

(60) Provisional application No. 62/986,293, filed on Mar. 6, 2020.

(51) Int. Cl.
*B66F 9/06*  (2006.01)
*B66F 9/075*  (2006.01)
(Continued)

(52) U.S. Cl.
CPC .......... *B66F 9/07581* (2013.01); *B66F 9/063* (2013.01); *B66F 9/0759* (2013.01);
(Continued)

(58) Field of Classification Search
CPC .... B66F 9/07581; B66F 9/063; B66F 9/0759; G05D 1/0011; G05D 1/0061;
(Continued)

(56) References Cited

U.S. PATENT DOCUMENTS 5,025,614 A * 6/1991 Orsborn ............... A01D 46/085
  56/10.2 G
5,938,710 A   8/1999 Lanza et al.
(Continued)

FOREIGN PATENT DOCUMENTS

CN  107548209 A  1/2018
CN  109131332 A * 1/2019 ............ B60W 10/04
(Continued)

OTHER PUBLICATIONS

English translation of WO-2019181665-A1.*
(Continued)

*Primary Examiner* — Anshul Sood
*Assistant Examiner* — Matthew Ho
(74) *Attorney, Agent, or Firm* — Quarles & Brady LLP

(57) ABSTRACT

A system for a remotely controllable material handling vehicle switchable between a manual mode and a travel request mode is provided. The system can include a control handle configured to at least control a speed and direction of the material handling vehicle when the material handling vehicle is in the manual mode and a remote control device in communication with the material handling vehicle and configured to provide a request to the material handling vehicle to move forward. The system can also include a mode switch configured to switch the material handling vehicle from the manual mode to the travel request mode and an operator compartment sensor configured to trigger a flag when a weight on a floor of an operator compartment of the material handling vehicle is greater than or equal to a predetermined weight.

19 Claims, 5 Drawing Sheets

(51) Int. Cl.
*G05D 1/00* (2006.01)
*G01S 17/931* (2020.01)

(52) U.S. Cl.
CPC ......... *G05D 1/0011* (2013.01); *G05D 1/0061* (2013.01); *G05D 1/0223* (2013.01); *G01S 17/931* (2020.01); *G05D 1/0088* (2013.01); *G05D 2201/0216* (2013.01)

(58) Field of Classification Search
CPC ............... G05D 1/0223; G05D 1/0088; G05D 2201/0216; G01S 17/931
See application file for complete search history.

(56) References Cited

U.S. PATENT DOCUMENTS

| | | | |
|---|---|---|---|
| 8,195,366 B2 | 6/2012 | McCabe et al. | |
| 8,725,317 B2 | 5/2014 | Elston et al. | |
| 8,725,362 B2 | 5/2014 | Elston et al. | |
| 8,725,363 B2 | 5/2014 | Elston et al. | |
| 10,179,723 B2 | 1/2019 | Kraimer et al. | |
| 10,301,155 B2 | 5/2019 | Dues et al. | |
| 2007/0182121 A1* | 8/2007 | Kraimer | B66F 9/07545 280/166 |
| 2019/0339696 A1* | 11/2019 | Mori | B60W 50/082 |
| 2020/0012274 A1* | 1/2020 | Kamiya | B66F 9/0755 |
| 2020/0133265 A1 | 4/2020 | Modolo | |
| 2020/0319643 A1 | 10/2020 | Paterson, Jr. et al. | |
| 2021/0064026 A1 | 3/2021 | Simon et al. | |
| 2021/0247770 A1 | 8/2021 | Theos et al. | |
| 2021/0261192 A1 | 8/2021 | Theos et al. | |
| 2021/0261391 A1 | 8/2021 | Theos et al. | |
| 2021/0261392 A1 | 8/2021 | Theos et al. | |
| 2021/0292145 A1 | 9/2021 | Theos et al. | |
| 2021/0292146 A1 | 9/2021 | Theos et al. | |

FOREIGN PATENT DOCUMENTS

| | | | |
|---|---|---|---|
| GB | 2460326 B | 8/2012 | |
| JP | 3775046 B2 * | 5/2006 | |
| JP | 2010222108 A | 10/2010 | |
| WO | 2011002478 A2 | 1/2011 | |
| WO | WO-2017147677 A1 * | 9/2017 | ............. B60K 26/02 |
| WO | 2019181665 A1 | 9/2019 | |
| WO | WO-2019181665 A1 * | 9/2019 | ............ B66F 17/003 |

OTHER PUBLICATIONS

English translation of CN-109131332-A.*
English translation of JP-3775046-B2.*
English translation of WO-2017147677-A1.*
European Patent Office, Extended Search Report, Application No. 21161068.8, dated Jul. 30, 2021, 7 pages.

* cited by examiner

SYSTEMS AND METHODS FOR CONTROL OF A REMOTELY CONTROLLABLE MATERIAL HANDLING VEHICLE

CROSS-REFERENCES TO RELATED APPLICATIONS

This application is based on and claims the priority to U.S. Provisional Patent Application No. 62/986,293, filed on Mar. 6, 2020, and entitled "Systems and Methods for Control of a Remotely Controllable Material Handling Vehicle."

STATEMENT REGARDING FEDERALLY SPONSORED RESEARCH

Not Applicable.

BACKGROUND

Warehouses typically employ the use of material handling vehicles, specifically, operators may use a remote control device to control travel of a material handling vehicle within the warehouse.

BRIEF SUMMARY

The present disclosure relates generally to material handling vehicles and, more specifically, to remotely controllable material handling vehicles that can be switched between a manual operation mode and a travel request mode.

According to some aspects of the present disclosure, a system for a remotely controllable material handling vehicle is provided. The material handling vehicle can be switchable between a manual mode and a travel request mode. In some aspects, the system can include a control handle configured to at least control a speed and direction of the material handling vehicle when the material handling vehicle is in the manual mode. In addition, a remote control device can be provided, the remote control device can be in communication with the material handling vehicle and configured to provide a request to the material handling vehicle to move forward. The system can also include a mode switch configured to switch the material handling vehicle from the manual mode to the travel request mode. In some aspects, the system can include an operator compartment sensor configured to trigger a flag when a weight on a floor of an operator compartment of the material handling vehicle is greater than or equal to a predetermined weight, where when the material handling vehicle is in the travel request mode the operator compartment sensor can be removed from communication with the material handling vehicle.

According to some aspects of the present disclosure, a system for a remotely controllable material handling vehicle operable in a manual mode where an operator can maneuver the material handling vehicle normally and a travel request mode where the operator can remotely request the material handling vehicle to move forward is provided. The system can include a control handle configured to at least control a speed and direction of the material handling vehicle when the material handling vehicle is in the manual mode, an operator compartment sensor configured to trigger a flag when a weight on a floor of an operator compartment of the material handling vehicle is greater than or equal to a predetermined weight, and a remote control device in communication with the material handling vehicle and including a travel control function configured to provide a first signal to the material handling vehicle to move forward. A manually-operable mode switch is provided for selecting an operation mode of the material handling vehicle and movable between a manual mode position and a travel request mode position. The manually-operable mode switch is configured to selectively bypass the operator compartment sensor.

According to some aspects of the present disclosure, a method for switching the operation of a material handling vehicle from a manual mode to a travel request mode is provided. The method can include evaluating a state of a manually-operable mode switch to determine if the manually-operable mode switch is in a manual mode position or a travel request mode position. The method can also include interpreting at least one vehicle condition to determine if the at least one vehicle condition is appropriate for transitioning from the manual mode to the travel request mode. In some aspects, upon the determination that the mode switch is in the travel request position and the at least one vehicle condition is appropriate for transitioning from the manual mode to the travel request mode, enabling remote control operation of the material handling vehicle.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
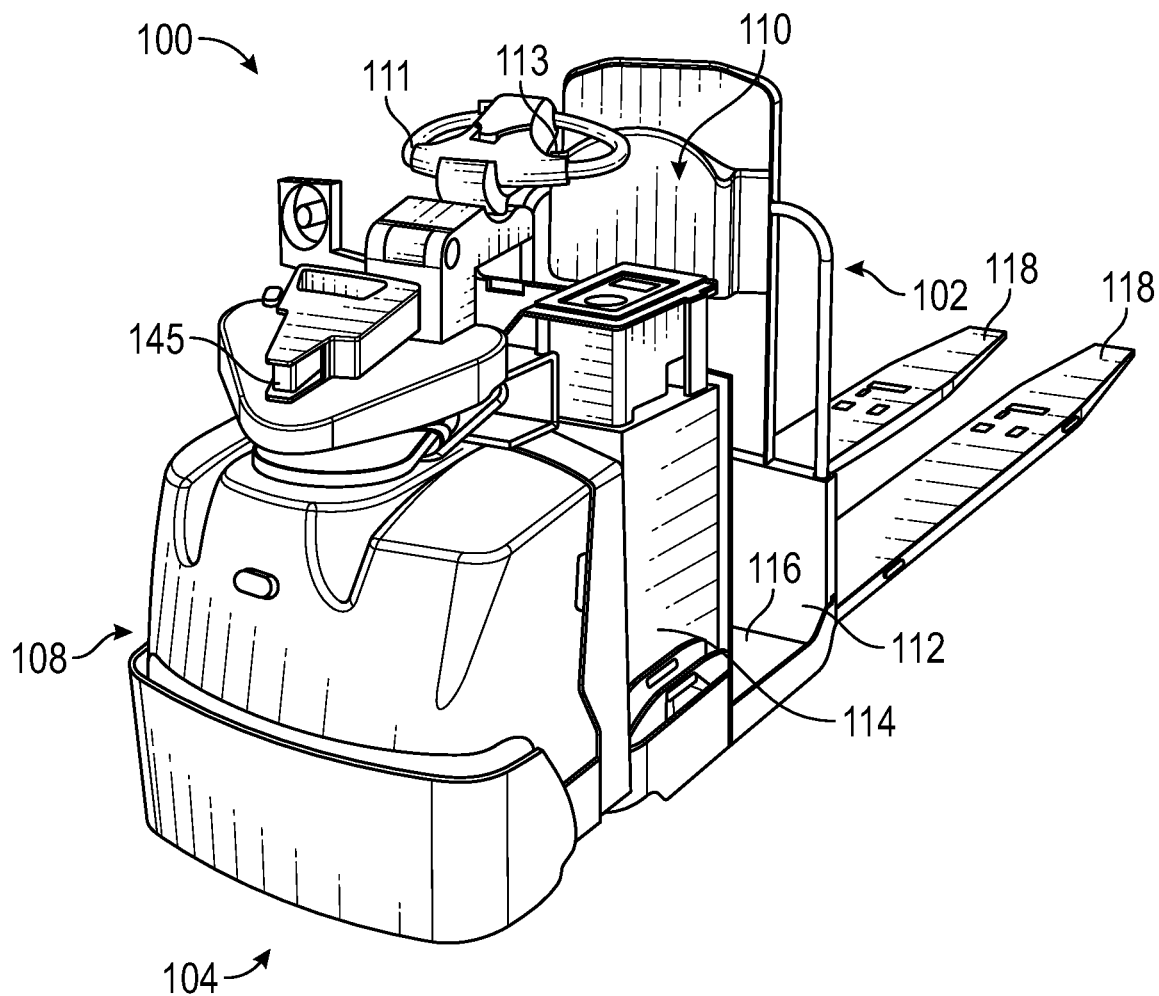
FIG. 1 is a top, front, left isometric view of a non-limiting example of a material handling vehicle including an operator compartment according to aspects of the present disclosure.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

It is also to be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

It is to be appreciated that material handling vehicles are designed in a variety of configurations to perform a variety of tasks. The various configurations of material handling vehicles described herein are shown by way of example. It will be apparent to those of skill in the art that the present invention is not limited to vehicles of these types, and can also be provided in various other types of material handling vehicle configurations, including for example, order pickers, reach vehicles, counterbalanced vehicles, and any other material handling vehicles. The various aspects disclosed herein are suitable for all of driver controlled, pedestrian controlled, remotely controlled, and autonomously controlled material handling vehicles.

Figure 2:
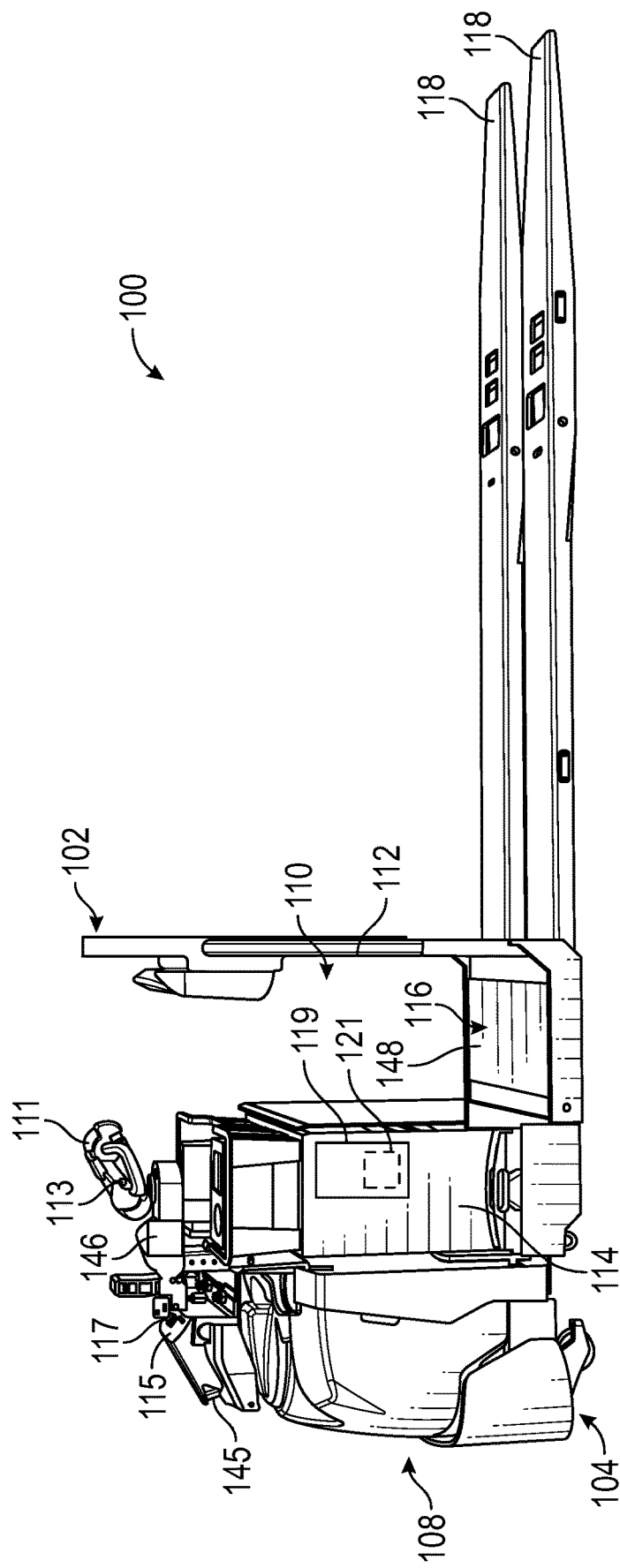
FIG. 2 is a top, left side view of the material handling vehicle of FIG. 1.

FIGS. 1 and 2 illustrate one non-limiting example of a material handling vehicle 100 according to the present disclosure. The material handling vehicle 100 may include a vehicle frame 102, a traction wheel 104, a power section 108, and an operator compartment 110. The power section 108 may be disposed within the vehicle frame 102 and may include a battery (not shown) configured to supply power to various components of the material handling vehicle 100. For example, the battery may supply power to a motor (not shown) and/or transmission (not shown) disposed within the power section 108 and configured to drive the traction wheel 104. In the illustrated non-limiting example, the traction wheel 104 is arranged under the power section 108. In other non-limiting examples, the traction wheel 104 may be arranged in another location under the vehicle frame 102.

The operator compartment 110 may include a control handle 111 configured to provide a user interface for an operator and to allow the operator to control a speed and direction of travel of the material handling vehicle 100. In some non-limiting examples, the control handle 111 may be configured to manually steer and control power to the traction wheel 104.

In the illustrated non-limiting example shown in FIGS. 1 and 2, the material handling vehicle 100 includes the operator compartment 110 arranged rearward of the power section 108 and having an operator opening 112 that opens towards lateral sides 114 of the material handling vehicle 100. The operator compartment 110 can define a floor 116 on which an operator of the material handling vehicle 100 may stand. In some non-limiting examples, the material handling vehicle 100 may be designed with the operator compartment arranged differently, for example, with an operator opening 112 that opens rearward. In the illustrated non-limiting example, the material handling vehicle 100 includes a pair of forks 118 that can be raised or lowered via actuators (not shown) in response to commands from the control handle 111.

As illustrated in FIG. 2, the material handling vehicle 100 may also include a holster 119. The holster 119 can, for example, be attached to a portion of the material handling vehicle 100. In the illustrated non-limiting example, the holster 119 is attached to a lateral side 114 of the material handling vehicle 100. The holster 119 can be configured to temporarily hold or store a remote control device 122 when the remote control device 122 is not being held by the operator. In some embodiments, the holster 119 can include an integrated charger 121 for the remote control device 122 such that the remote control device 122 can be charged while being stored in the holster 119. In some non-limiting examples, when an operator places the remote control device 122 in the holster 119, the remote control device 122 is unpaired from the material handling vehicle 100.

Figure 3:
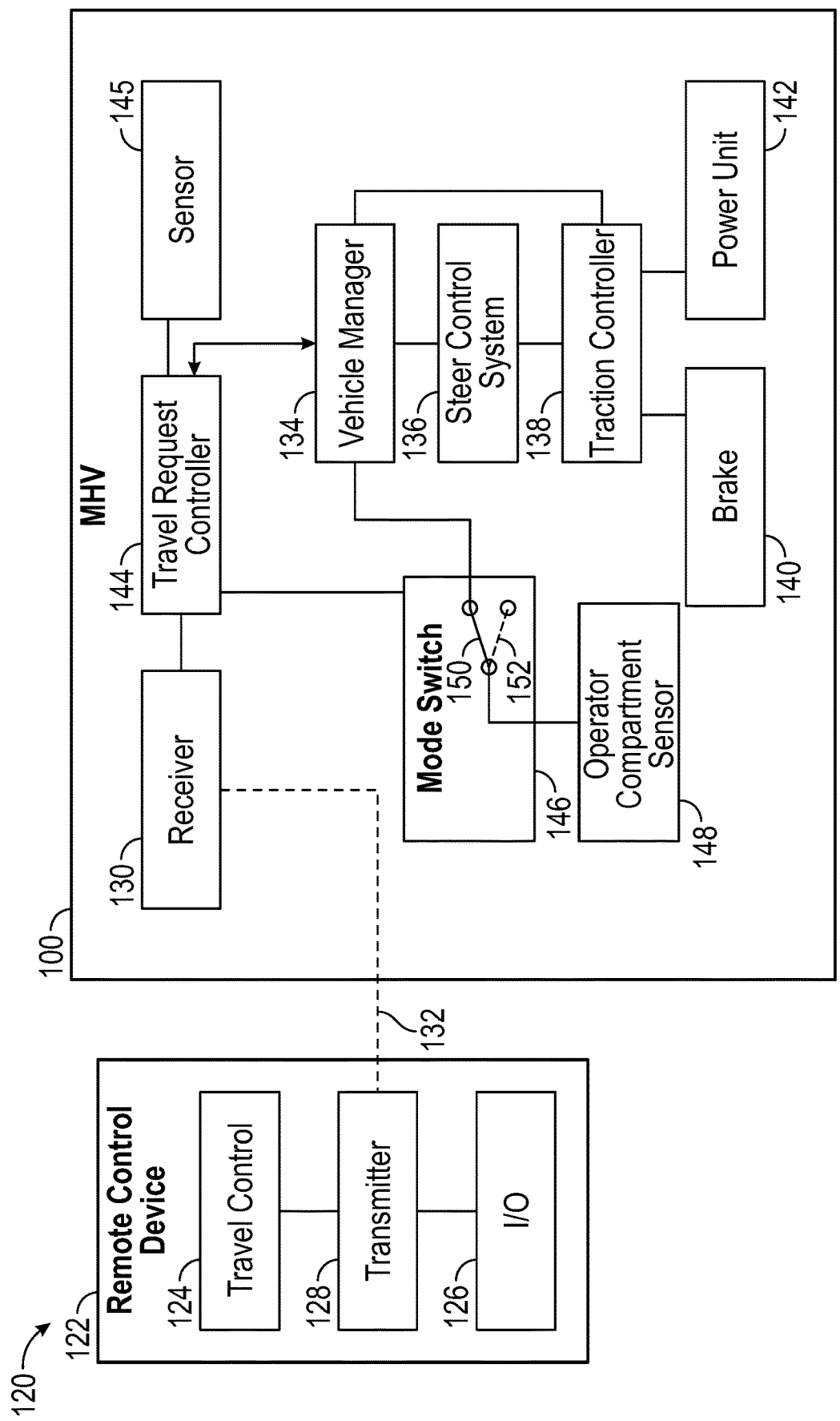
FIG. 3 is a schematic illustration of a system for a remotely controllable material handling vehicle according to aspects of the present disclosure.
Figure 6:
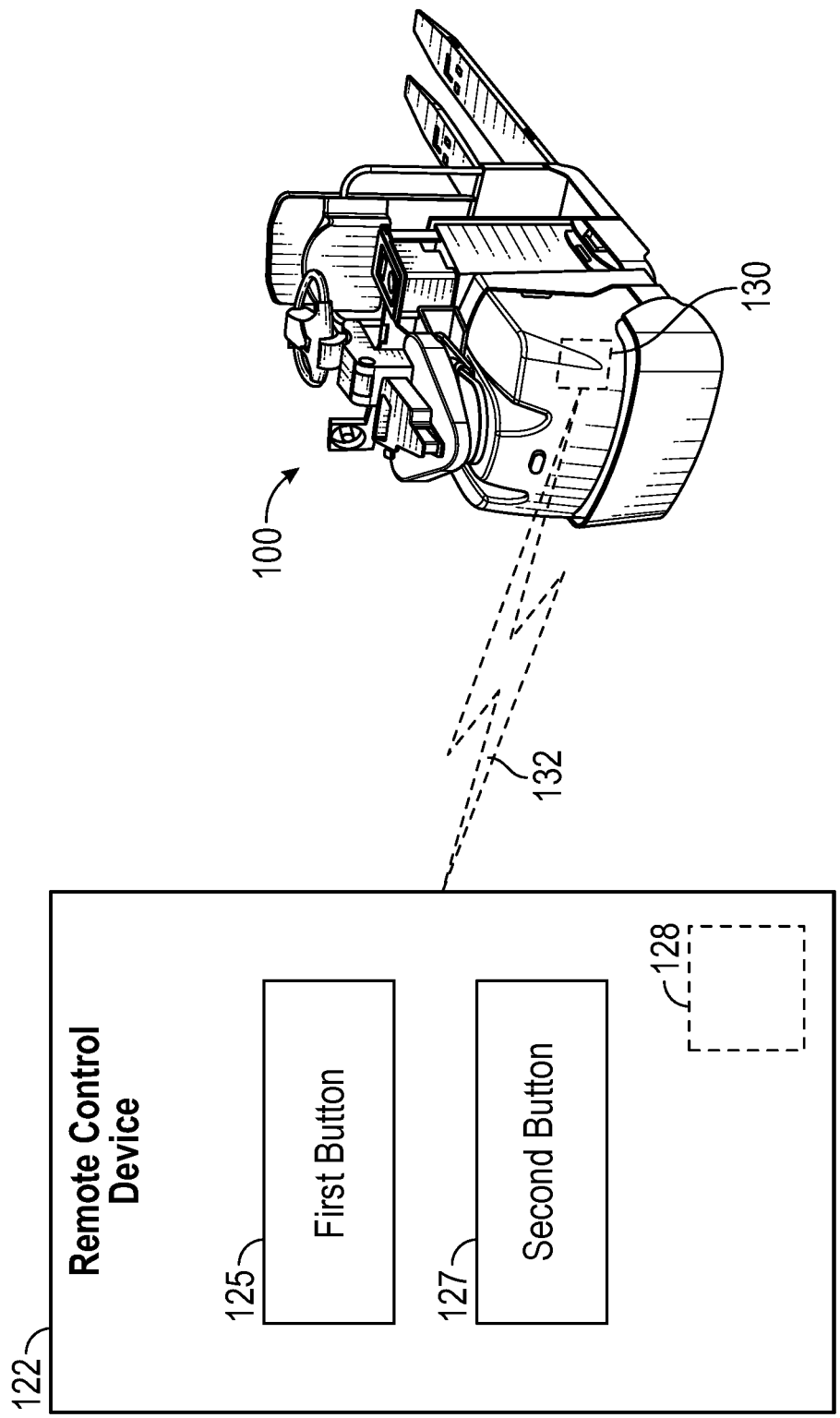
FIG. 6 is an exemplary illustration of an operator-controlled remote control device in communication with the material handling vehicle of FIG. 1.

FIG. 3 illustrates one non-limiting example of a system 120 for a remotely controllable material handling vehicle, which may be implemented, for example, in the material handling vehicle 100 shown in FIG. 1. The system 120 includes a remote control device 122 in communication with the material handling vehicle 100. The remote control device 122 is operable by an operator of the material handling vehicle 100 and can include a travel control function 124 and an I/O function 126. The travel control function 124 and the I/O function 126 can be configured as first and second manually-operable functions that can be operated by, for example, a button or a switch located on the remote control device 122. For example, the travel control function 124 can be operated by a first button 125 on the remote control device 122 and the I/O function 126 can be operated by a second button 127 on the remote control device 122 (see FIG. 6). The travel control function 124 and the I/O function 126 can be in electrical communication with a transmitter 128 within the remote control device 122. The transmitter 128 on the remote control device 122 can wirelessly communicate with the material handling vehicle 100 via a receiver 130 located on the material handling vehicle 100, as represented by dashed line 132. In some non-limiting examples, the remote control device 122 may turn off after several minutes of inactivity.

As will be described herein, the travel control function 124 can be configured to send a first signal from the transmitter 128 to the receiver 130 located on the material handling vehicle 100. The first signal can be configured to instruct the material handling vehicle 100 to move forward from one location to the next within a warehouse while the operator is operating the travel control function 124 on the remote control device 122. For example, the operator may desire the material handling vehicle 100 to move in an aisle along a rack within a warehouse from one picking location to the next picking location without the operator frequently entering/exiting the operator compartment 110 on the material handling vehicle 100. Instead, the operator can operate the travel control function 124 on the remote control device 122 from outside the operator compartment 110 to move the material handling vehicle 100. That is, the travel control function 124, when actuated by the operator, provides a request to the material handling vehicle 100 to move forward. In some non-limiting examples, a duration of the forward movement of the material handling vehicle can be controllable by maintaining the travel control function 124 in an actuated state. For example, the operator can control the duration of time the material handling vehicle 100 is moving by depressing and holding the travel control function 124. In some non-limiting examples, releasing the travel control function 124 after the travel control function 124 has been held can cause the material handling vehicle 100 to stop moving forward and/or coast to a stop.

In some non-limiting examples, there may be a limited time duration on the holding of the travel control function 124 (e.g., after ten seconds, or more or less than ten seconds), after which travel of the material handling vehicle 100 may stop. In this specific non-limiting example, if the operator needs to "reset" this limited time duration, a rapid "release-and-re-hold" (e.g., within 2.5 seconds, or more or less than 2.5 seconds) of the travel control function 124 can "reset" the limited time duration without the material handling vehicle 100 coming to a stop.

The I/O function 126 can be configured to send a second signal from the transmitter 128 to a receiver 130 located on the material handling vehicle 100. In some non-limiting examples, the second signal may cause a series of events to occur, such as unpairing the remote control device 122 from the material handling vehicle 100 and stopping the material handling vehicle 100 from moving forward. For example, the I/O function 126, when actuated by the operator, unpairs the remote control device 122 from the material handling vehicle 100.

The material handling vehicle 100 ("MHV") can also include a vehicle manager 134 ("VM"). In the illustrated non-limiting example, the vehicle manager can be in electrical communication with a steering control system 136 and a traction controller 138. The vehicle manager 134 can be configured to issue commands and control the steering control system 136. For example, the vehicle manager 134 can send a signal to the steering control system 136 to perform a steering maneuver or issue steering commands. The steering control system 136 may then perform the issued steering commands based on the received signal. The vehicle manager 134 can be configured to issue commands and control the traction controller 138. For example, the vehicle manager 134 can send a signal to the traction controller 138 to move, position, accelerate, slow, or otherwise change a speed of the material handling vehicle 100. The traction controller 138 may then communicate (e.g., via electrical communication) to a brake 140 or a power unit 142 to change the speed of the material handling vehicle. In addition, the vehicle manager 134 can be configured to evaluate vehicle conditions from the steer control system 136 and the traction controller 138. In one non-limiting example, the steer control system 136 can sense (e.g., via a sensor) a steering angle of the material handling vehicle 100. In another non-limiting example, the traction controller 138 can sense a speed (e.g., via a sensor) of the material handling vehicle 100. In either case, the sensed steering angle or speed of the material handling vehicle 100 can be communicated to the vehicle manager 134.

Referring still to FIG. 3, the material handling vehicle 100 may also include a travel request controller 144 ("TRC"). The travel request controller 144 can be in electrical communication with the receiver 130 such that the receiver 130 can receive the first and second signals from the transmitter 128 on the remote control device 122 and transmit the first and second signals to the travel request controller 144 to interpret them. The travel request controller 144 can also be in electrical communication with the vehicle manager 134 such that signals and commands can be sent between the travel request controller 144 and the vehicle manager 134.

The material handling vehicle 100 can also have a sensor 145 (e.g., positioned at a front of the vehicle, see FIGS. 1-2). In one non-limiting example, the sensor 145 can be a time-of-flight camera or a 2D or 3D LIDAR scanner, however other obstacle detection capable sensors are also envisioned, such as any other obstacle detection sensor known in the art. The sensor 145 can be in electrical communication with the travel request controller 144 and can be configured to sense or detect obstacles located in or near a travel path of the vehicle. In one non-limiting example, the sensor 145 may also be configured to detect a rack located along a lateral side 114 of the material handling vehicle 100.

Referring now to FIGS. 1-3, the material handling vehicle 100 can have a manually-operable mode switch 146 (e.g., a rocker switch) configured to transition the vehicle between a manual mode and a travel request mode. The mode switch 146 can be positioned within or near the operator compartment 110 for access by the operator of the material handling vehicle 100. For example, the mode switch 146 can be positioned on the control handle 111, next to a display 115, or on a control panel 117 and accessible by the operator (see FIG. 2). In another non-limiting example, the mode switch 146 can be positioned on the outside of the material handling vehicle 100. For example, the mode switch 146 can be positioned on one or both of the lateral sides 114 or on the vehicle frame 102.

The mode switch 146 can be in electrical communication with an operator compartment sensor 148. The operator compartment sensor 148 is configured to detect if an operator of the material handling vehicle 100 is within the operator compartment 110. The operator compartment sensor 148 can be located in, on, or under the floor 116. In one non-limiting example, the operator compartment sensor 148 can be a pressure or force sensor positioned in a floor portion (e.g., included in the floor 116) of the material handling vehicle 100 such that the force or pressure sensor can detect when a weight on the floor 116 is equal to or above a predetermined weight threshold (see FIG. 2). For example, the operator compartment sensor 148 can be configured to trigger a flag (e.g., an electrical indication or signal) when a weight on the floor 116 of the operator compartment 110 of the material handling vehicle 100 is greater than or equal to a predetermined weight. According to one non-limiting example, the operator compartment sensor 148 can include a set of parallel plates that, when unloaded, are separated by a gap. Upon the application of a weight greater than or equal to the predetermined weight onto the operator compartment sensor 148 (e.g., onto an upper plate), the set of parallel plates can touch to generate a flag indicating that an operator is in the operator compartment 110. The flag can be incorporated into a signal sent to the vehicle manager 134. That is, when the operator compartment sensor 148 detects a weight greater than or equal to the predetermined weight, the operator compartment sensor 148 can generate an electrical signal in the form of a flag to indicate to the vehicle manager 134 that an operator is in the operator compartment 110 of the material handling vehicle 100.

As will be described herein, the mode switch 146 can be configured to selectively bypass the operator compartment sensor 148 depending on the selected mode. For example, the mode switch 146 may be configured to allow signals from the operator compartment sensor 148 to communicate with the vehicle manager 134 when the mode switch 146 is in a manual mode position, as illustrated by solid line 150. When the mode switch 146 is in a travel request mode position, the mode switch 146 is configured to bypass the operator compartment sensor 148, which prevents signals from the operator compartment sensor 148 from reaching the vehicle manager 134, or otherwise removes the operator compartment sensor 148 from communication with the vehicle manager 134, as illustrated by dashed line 152. In some non-limiting examples, the mode switch 146 can be a double-pole double-throw (DPDT) switch and be configured such that when the mode switch 146 is actuated from one position to another, the operator compartment sensor 148 can be taken in and out of communication with the vehicle manager 134.

Now that the components of the system 120 has been described, operation of the remotely controlled material handling vehicle 100 will be described in the paragraphs to follow with reference to FIGS. 1-3. When the mode switch 146 is in the manual mode position, the material handling vehicle 100 can be operated normally by the operator. For example, the operator can use the control handle 111 on the material handling vehicle 100 to accelerate, decelerate, steer, or otherwise maneuver the material handling vehicle 100 manually by using a throttle or brake button/lever located on the control handle 111. In one non-limiting example, the control handle 111 may include one or more jog buttons 113 configured to, when engaged, cause the material handling vehicle 100 to travel at a walking speed. Upon release of the jog button 113, the material handling vehicle 100 may coast to a stop.

When the mode switch 146 is in the manual mode position, the operator compartment sensor 148 is in communication with the vehicle manager 134 to enable the vehicle manager 134 to restrict operation of the material handling vehicle 100 dependent upon the operator compartment sensor 148 detecting the weight of an operator. For example, when the operator is standing in the operator compartment 110, the vehicle manager 134 can receive a signal in the form of a flag from the operator compartment sensor 148 indicating that an operator is in the operator compartment 110. While the operator is in the operator compartment 110, the material handling vehicle 100 can be enabled to provide full functionality to the operator such that the operator can operate the vehicle normally using the control handle 111 previously described above. When the operator is not standing in the operator compartment 110 (e.g., when the sensed weight is less than the predetermined weight), the vehicle manager 134 can receive a signal (e.g., a flag) from the operator compartment sensor 148 indicating that an operator is not in the operator compartment 110. While the operator is outside of the operator compartment 110, the material handling vehicle 100 can be restricted in its operation. In one non-limiting example, the material handling vehicle 100 may be prevented from travelling, or only allowed to travel up to a walking speed when a weight is not sensed by the operator compartment sensor 148, for example, during use of the jog button 113 by the operator.

The remote control device 122 can be paired, unpaired, or otherwise connected/disconnected to the material handling vehicle 100 when the mode switch 146 is in the manual mode. However, travel or I/O commands (e.g., the first and second signals, respectively) generated by the remote control device 122 may not be executed by the travel request controller 144 or communicated to the vehicle manager 134. For example, when the mode switch 146 is in the manual mode, the operator is unable to maneuver the material handling vehicle 100 using the remote control device 122. According to some embodiments, I/O commands delivered by the remote control device 122 may still be sent to the travel request controller 144 to unpair the remote control device 122.

Conversely, when the mode switch 146 is in the travel request mode, travel or I/O signals (e.g., the first and second signals, respectively) generated by the remote control device 122 are communicated to the vehicle manager 134 via the travel request controller 144. For example, when the mode switch 146 is in the travel request mode, the operator can cause the material handling vehicle 100 to move forward using the travel control function 124 and can cause the material handling vehicle 100 to unpair from the remote control device 122 using the I/O function 126 on the remote control device 122. Additionally, when the mode switch 146 is in the travel request mode, the operator is unable to maneuver the material handling vehicle 100 using the control handle 111. For example, steering or throttle inputs, including inputs from the jog buttons 113, from the control handle 111 may not be communicated to, or ignored by, the vehicle manager 134. For example, the throttle on the control handle 111 can be prevented from controlling the speed of the material handling vehicle 100. In some embodiments, the jog buttons 113 may remain functional. For example, when the mode switch 146 is in the travel request mode position, and the remote control device 122 is yet to be paired, the jog buttons 113 may remain functional. If a remote control device 122 is then paired to the material handling vehicle 100, the jog buttons 113 may no longer be functional. In some non-limiting examples, a horn button (not shown) may be located on the control handle 111, and the horn button may remain active and usable by the operator when the material handling vehicle 100 is in either of the manual mode or the travel request mode. The operator is also unable to manipulate the forks 118 using the control handle 111 when the material handling vehicle 100 is in the travel request mode. For example, when the remote control device 122 is paired with the material handling vehicle 100, the forks 118 may not be maneuverable (e.g., raised or lowered) by the operator. As previously noted above, when the mode switch 146 is placed in the travel request mode position, the mode switch 146 is configured to disable communication between the operator compartment sensor 148 and the vehicle manager 134.

Figure 4:
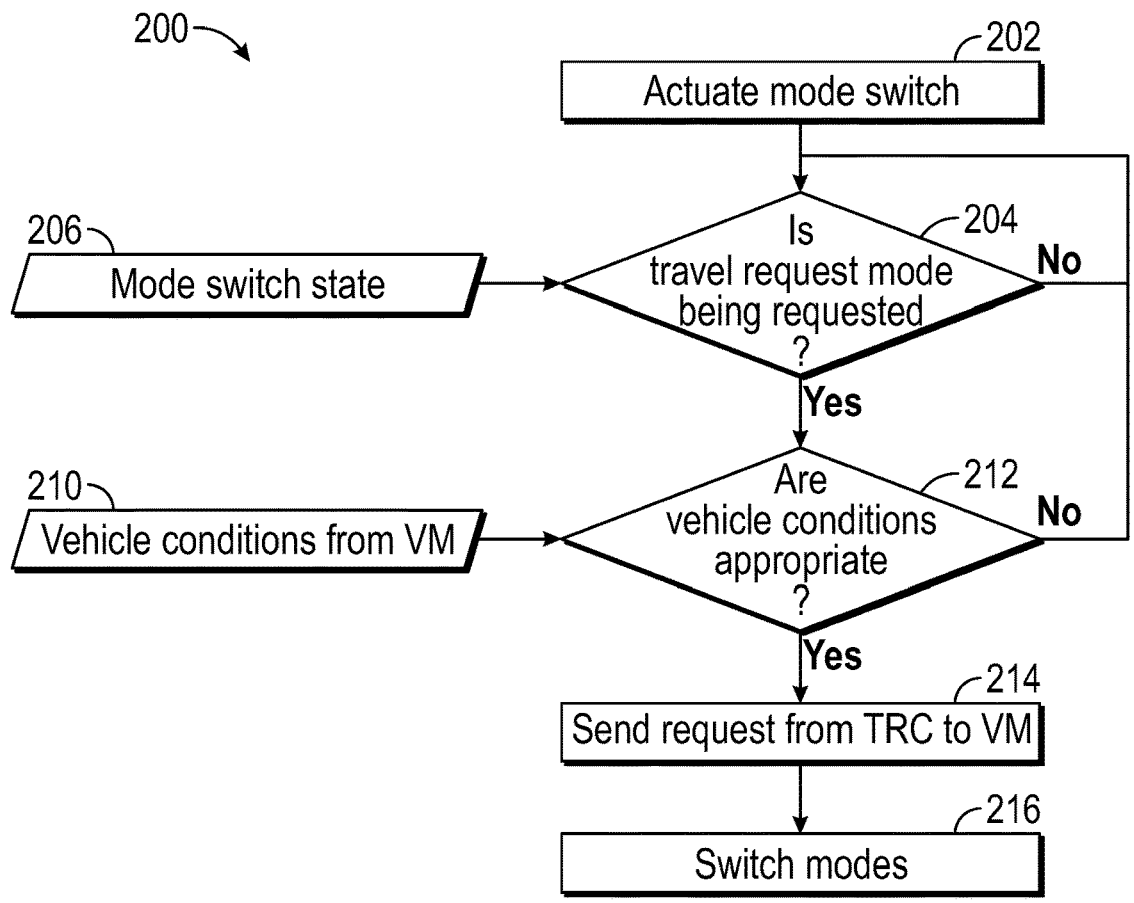
FIG. 4 is a schematic illustration of a method of switching a mode of operation of the material handling vehicle.

Referring now to FIG. 4, a method 200 of switching the material handling vehicle 100 from the manual mode to the travel request mode will be described. The process may start at step 202, where an operator manually actuates the mode switch 146. Upon actuating the mode switch 146 from the manual mode position to the travel request mode position, the operator compartment sensor 148 is taken out of communication with the vehicle manager 134 (e.g., as indicated by dashed line 152 in FIG. 3). The travel request controller 144 can then evaluate the state of the mode switch 146 to check to determine if the mode switch 146 is in the manual mode position or the travel request mode position at step 204 to determine if the travel request mode is being requested, as illustrated by input block 206. In some non-limiting examples, the vehicle manager 134 can communicate the state of the mode switch 146 to the travel request controller 144.

If the travel request controller 144 determined that the mode switch 146 is not in the travel request mode position, then the travel request controller 144 takes no action and the process may return to the start. If the travel request controller 144 determined that the mode switch 146 is in the travel request mode position, the process proceeds to step 212.

At step 212, the travel request controller 144 then evaluates vehicle condition data received from the vehicle manager 134, as illustrated by input block 210. The vehicle condition data can include vehicle speed and/or vehicle steering angle, for example, as sensed by sensors included in the traction controller 138 and/or the steer control system 136, respectively. The travel request controller 144 evaluates the vehicle condition data to determine if the vehicle conditions are appropriate for switching from the manual mode to the travel request mode. For example, some vehicle conditions may not be considered an acceptable vehicle condition that would allow for transitioning between modes. According to one specific non-limiting example, the travel request controller 144 can evaluate the speed of the material handling vehicle 100. For example, the travel request controller 144 may use the vehicle speed received from the vehicle manager 134 and compare the vehicle speed to a threshold value defined for a stopped vehicle (e.g., approximately 0 mph) to determine if the vehicle conditions are appropriate for switching modes. In one non-limiting example, the threshold value can be zero mph. If the travel request controller 144 determines that the vehicle speed is greater than the threshold value, then the travel request controller 144 determines that the vehicle conditions are not appropriate for switching modes. Conversely, if the travel request controller 144 determines that the vehicle speed is at or less than the threshold value, then the travel request controller 144 determines that the vehicle conditions are appropriate for switching modes.

If the travel request controller 144 determines that the vehicle conditions are not appropriate for switching to the travel request mode, then the travel request controller 144 takes no action and the process may return to the start. If the travel request controller 144 determines that the vehicle conditions are appropriate for switching to the travel request mode, then the travel request controller 144 can send a signal to the vehicle manager 134 to request a transition from the manual mode to the travel request mode at step 214.

In response to the signal sent from the travel request controller 144 to the vehicle manager 134 to request to switch to the travel request mode, the vehicle manager 134 can switch the material handling vehicle 100 into to the travel request mode at step 216. With the material handling vehicle 100 in the travel request mode, remote operation of the material handling vehicle 100 by the operator using the remote control device 122 is then enabled. For example, signals from the remote control device 122 can be communicated to the travel request controller 144. The travel request controller 144 can then generate vehicle commands and then communicate those vehicle commands to the vehicle manager 134 for execution.

The material handling vehicle 100 can be switched back to the manual mode from the travel request mode by the operator manually actuating the mode switch 146 from the travel request mode position to the manual mode position. Upon actuating the mode switch 146 from the travel request mode position to the manual mode position, the operator compartment sensor 148 is brought back into communication with the vehicle manager 134 (e.g., as indicated by line 150 in FIG. 3). According to one non-limiting example, the material handling vehicle can be switched back to the manual mode from the travel request mode by the vehicle manager 134, if the vehicle manager 134 detects vehicle conditions that result in switching back to the manual mode.

Figure 5:
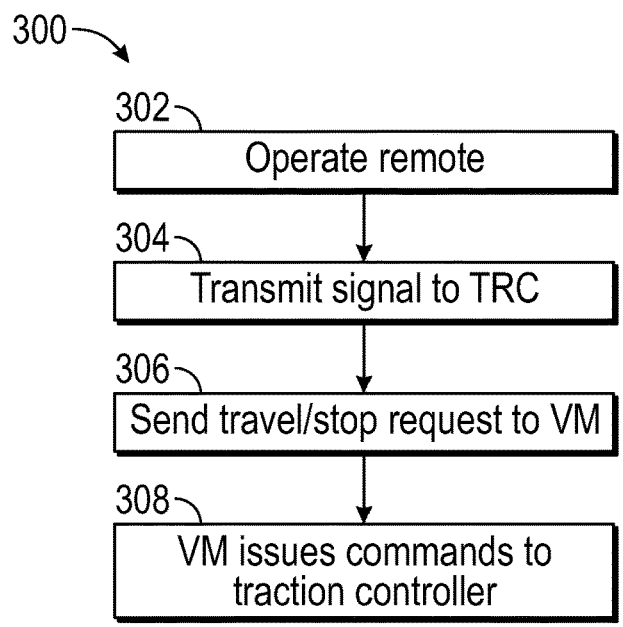
FIG. 5 is a schematic illustration of a method of operation of the material handling vehicle in a travel request mode.

Referring now to FIGS. 3 and 5, a method 300 of remotely operating the material handling vehicle 100 using the remote control device 122 when the material handling vehicle 100 is in a travel request mode is illustrated. In the exemplary discussion to follow, the example of an order picking operation will be described, where an operator of a material handling vehicle 100 may desire to move along an aisle within a warehouse from one picking location to the next picking location. One of ordinary skill in the art readily recognizes that this is just one example of operation and is not intended to be limiting in any way.

The method 300 may begin at step 302, where the operator can actuate one of the travel control function 124 or the I/O function 126 on the remote control device 122, thus generating a first signal or a second signal, respectively. At step 304, the transmitter 128 may wirelessly communicate the first and/or second signal to the travel request controller 144 via the receiver 130 in communication with the transmitter 128. The travel request controller 144 may then send a request (e.g., a vehicle command) to the vehicle manager 134 based on the received signal at step 306. For example, if the operator actuates the travel control function 124 on the remote control device 122 (e.g., by depressing the first button 125 on the remote control device 122, see FIG. 6), the travel request controller 144 can send a travel command to the vehicle manager 134 to instruct the material handling vehicle 100 to move, or otherwise travel forward. According to another example, if the operator actuates the I/O function 126 on the remote control device 122, an unpair command is sent to the travel request controller 144 to request that the material handling vehicle 100 be unpaired from the remote control device 122 and a stop command can be sent from the travel request controller 144 to the vehicle manager 134 to instruct the material handling vehicle 100 to come to a stop.

In response to the received commands, the vehicle manager 134 can communicate to the traction controller 138 at step 308 to operate the power unit 142 to enable the material handling vehicle 100 to travel or stop (e.g., if a travel command or a stop command is received, respectively). For example, the material handling vehicle 100 may be at a first picking location within an aisle of a warehouse and the operator may desire the material handling vehicle 100 to travel to a second picking location within that aisle. The travel command executed by the vehicle manager 134 can enable the material handling vehicle to travel forward from the first picking location to the second picking location.

While the material handling vehicle 100 is traveling, the travel request controller may monitor the sensor 145 to determine if the material handling vehicle 100 should steer or stop. In the case that the sensor 145 provides an indication that the material handling vehicle 100 should steer, the travel request controller 144 can send a steer command to the vehicle manager 134 to request a steering maneuver. In response to the received steering command, the vehicle manager 134 can communicate to the steer control system 136 to maneuver the material handling vehicle 100 (e.g., to steer the material handling vehicle 100 to travel alongside a rack structure). In the case that the sensor 145 provides an indication that the material handling vehicle 100 should stop, for example, in response to detecting an obstacle in a travel path of the material handling vehicle 100, the travel request controller can send a stop command to the vehicle manager 134 to request that the material handling vehicle 100 come to a stop. In response to the received stop command, the vehicle manager 134 can communicate to the traction controller 138 to stop the material handling vehicle 100 (e.g., to stop the material handling vehicle 100 if the sensor 145 detects an obstacle in a travel path of the material handling vehicle 100).

For certain types of vehicles there are training requirements imposed by various government agencies, laws, rules and regulations. For example, the United States Department of Labor Occupational Safety and Health Administration (OSHA) imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environment, and always look in the direction of travel.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A system for a remotely controllable material handling vehicle switchable between a manual mode and a travel request mode, the system comprising:
   a control handle configured to at least control a speed and direction of the material handling vehicle when the material handling vehicle is in the manual mode;
   a remote control device in communication with the material handling vehicle and configured to provide a request to the material handling vehicle to move forward;
   a mode switch configured to switch the material handling vehicle from the manual mode to the travel request mode; and
   an operator compartment sensor configured to trigger a flag when a weight on a floor of an operator compartment of the material handling vehicle is greater than or equal to a predetermined weight, wherein when the material handling vehicle is in the travel request mode the operator compartment sensor is removed from communication with the material handling vehicle.

2. The system of claim 1, wherein the remote control device includes a first manually-operable function that, when actuated by the operator, provides the request to the material handling vehicle to move forward.

3. The system of claim 2, wherein a duration of the forward movement of the material handling vehicle is controllable by maintaining the first manually-operable function in an actuated state.

4. The system of claim 2, wherein the remote control device further includes a second manually-operable function that, when actuated by the operator, unpairs the remote control device from the material handling vehicle.

5. The system of claim 1, wherein when the mode switch is in the travel request mode, a throttle on the control handle is prevented from controlling the speed of the material handling vehicle.

6. The system of claim 1, wherein the operator compartment sensor is one of a pressure or force sensor arranged on a floor portion of the operator compartment.

7. The system of claim 1, wherein the remote control device is configured to wirelessly communicate with the material handling vehicle.

8. The system of claim 1, wherein the mode switch is a double-pole double-throw switch.

9. The system of claim 1, further comprising an obstacle detection sensor configured to provide an indication to the material handling vehicle to stop in response to sensing obstacles located in a travel path of the material handling vehicle.

10. A system for a remotely controllable material handling vehicle operable in a manual mode where an operator can maneuver the material handling vehicle normally and a travel request mode where the operator can remotely request the material handling vehicle to move forward, the system comprising:
    a control handle configured to at least control a speed and direction of the material handling vehicle when the material handling vehicle is in the manual mode;
    an operator compartment sensor configured to trigger a flag when a weight on a floor of an operator compartment of the material handling vehicle is greater than or equal to a predetermined weight;
    a remote control device in communication with the material handling vehicle and including a travel control function configured to provide a first signal to the material handling vehicle to move forward; and
    a manually-operable mode switch for selecting an operation mode of the material handling vehicle and movable between a manual mode position and a travel request mode position, wherein the manually-operable mode switch is configured to selectively bypass the operator compartment sensor.

11. The system of claim 10, wherein when the manually-operable mode switch is in the travel request mode position, the operator compartment sensor is removed from communication with the material handling vehicle.

12. The system of claim 10, wherein the remote control device further includes a pairing function configured to provide a second signal to the material handling vehicle to unpair the remote control device with the material handling vehicle.

13. The system of claim 10, wherein a duration of the forward movement of the material handling vehicle is controllable by maintaining the travel control function in an actuated state.

14. The system of claim 10, wherein when the manually-operable mode switch is in the travel request mode, a throttle on the control handle is prevented from controlling the speed of the material handling vehicle.

15. The system of claim 10, wherein the operator compartment sensor is one of a pressure or force sensor arranged on a floor portion of the operator compartment.

16. The system of claim 10, wherein the remote control device is configured to wirelessly communicate with the material handling vehicle.

17. The system of claim 10, wherein the mode switch is a double-pole double-throw switch.

18. A method for switching an operation mode of a material handling vehicle from a manual mode to a travel request mode, the method comprising:

evaluating a state of a manually-operable mode switch to determine if the mode switch is in a manual mode position or a travel request mode position;

interpreting at least one vehicle condition to determine if the at least one vehicle condition is appropriate for transitioning from the manual mode to the travel request mode; and upon the determination that the manually-operable mode switch is in the travel request mode position and the at least one vehicle condition is appropriate for transitioning from the manual mode to the travel request mode, enabling remote control operation of the material handling vehicle, wherein when the manually-operable mode switch is in the travel request mode position, an operator compartment sensor included on the material handling vehicle is removed from communication with the material handling vehicle.

19. The method of claim 18, wherein the at least one vehicle condition includes one of speed or steering angle.

* * * * *